United States Patent
Chetlur et al.

(10) Patent No.: US 9,471,460 B2
(45) Date of Patent: Oct. 18, 2016

(54) CHARACTERIZATION OF REAL-TIME SOFTWARE BASE-STATION WORKLOADS AT FINE-GRAINED TIME-SCALES

(75) Inventors: Malolan Chetlur, Bangalore (IN); Parul Gupta, Bangalore (IN); Mukundan Madhavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 13/434,168

(22) Filed: Mar. 29, 2012

(65) Prior Publication Data
US 2013/0263135 A1  Oct. 3, 2013

(51) Int. Cl.
*G06F 11/34* (2006.01)
*H04W 24/02* (2009.01)

(52) U.S. Cl.
CPC ....... *G06F 11/3457* (2013.01); *G06F 11/3442* (2013.01); *H04W 24/02* (2013.01)

(58) Field of Classification Search
CPC .................................................. G06F 9/46
USPC .......................................................... 718/100
See application file for complete search history.

(56) References Cited

U.S. PATENT DOCUMENTS

| | | | |
|---|---|---|---|
| 7,543,052 B1 * | 6/2009 | Cesa Klein ................... | 709/224 |
| 7,818,746 B2 * | 10/2010 | Anderson ..................... | 718/102 |
| 2004/0111727 A1 * | 6/2004 | Schwarzbauer et al. ..... | 719/310 |
| 2004/0210877 A1 | 10/2004 | Sluiman et al. | |
| 2005/0195834 A1 * | 9/2005 | Kikuchi ............... | H04L 47/125 370/396 |
| 2007/0099606 A1 * | 5/2007 | Strohlein .............. | H04W 24/00 455/423 |
| 2008/0301691 A1 * | 12/2008 | Mamagkakis et al. ....... | 718/104 |
| 2009/0300632 A1 * | 12/2009 | Falcon et al. ................. | 718/103 |
| 2010/0293535 A1 | 11/2010 | Andrade et al. | |
| 2010/0318994 A1 | 12/2010 | Holmberg et al. | |
| 2011/0083131 A1 | 4/2011 | Pirzada et al. | |
| 2011/0276594 A1 | 11/2011 | Chong et al. | |
| 2013/0055283 A1 * | 2/2013 | Mopur .................. | G06F 9/5083 718/104 |
| 2013/0114963 A1 * | 5/2013 | Stapleton .............. | H04W 24/02 398/115 |

* cited by examiner

*Primary Examiner* — Hassan Kizou
*Assistant Examiner* — Abdullahi Ahmed
(74) *Attorney, Agent, or Firm* — Ference & Associates LLC

(57) ABSTRACT

Methods and arrangements for characterizing software base-station workloads. Input system parameters are mapped to work-determining parameters which act to determine computational requirements of a dynamic workload. A synthetic experiment is undertaken to measure the computational requirements determined by the work-determining parameters.

21 Claims, 7 Drawing Sheets

| Cumulative Input Workload | Frame-processing Latency (μs) | Hardware Needs (CPU Cycles/frame) | Hardware needs (CPU CPS) |
|---|---|---|---|
| 0 | | | |
| 600 | 20 | 6 × 10⁴ | 1.2 × 10⁷ |
| 1200 | 40 | 1.2 × 10⁵ | 2.4 × 10⁷ |
| 2400 | 60 | 1.8 × 10⁵ | 3.6 × 10⁷ |
| 3000 | 80 | 2.4 × 10⁵ | 4.8 × 10⁷ |
| 5000 | 100 | 3 × 10⁵ | 6 × 10⁷ |
| 6000 | 160 | 4.8 × 10⁵ | 9.6 × 10⁷ |
| 7000 | 180 | 5.4 × 10⁵ | 10.8 × 10⁷ |
| 8000 | 220 | 6.6 × 10⁵ | 13.2 × 10⁷ |
| 9000 | 240 | 7.2 × 10⁵ | 14.4 × 10⁷ |
| 9000 | 260 | 7.8 × 10⁵ | 15.6 × 10⁷ |
| 10000 | 280 | 8.4 × 10⁵ | 16.8 × 10⁷ | though the processing latency of each module could be as small as a few hundred microseconds or up to a few milliseconds, depending on load.
CHARACTERIZATION OF REAL-TIME SOFTWARE BASE-STATION WORKLOADS AT FINE-GRAINED TIME-SCALES

BACKGROUND

Generally, wireless networks are evolving towards implementations of Software Defined Radio (SDR), in order to minimize network costs as well as make base-station upgrade cycles shorter. As things stand, base-station components (e.g., MAC, PHY) represent real-time workloads with periodic strict time deadlines. For example, WiMAX processing (MAC+PHY) has a frame-deadline once every few milliseconds (e.g., 2 to 5 ms). The processing latency of each module could be as small as a few hundred microseconds or up to a few milliseconds, depending on load.

During network deployment, the characterization of base-station resource requirements at different workloads is useful in provisioning base-station network hardware in SDR-based networks. Further, when base-stations processors are co-hosted on a private cloud, profiling is useful for hot-spot detection and performance problem diagnosis. Typically, base-station processing deadlines are at a per-frame level, which implies that resource allocation should be worked in with per-frame deadlines. Thus, profiling at a granularity of per-frame processing (e.g., on the order of microseconds) can prove useful and advantageous.

Conventionally, profiling tools have not been found to be reliable at the above-noted smaller granularities. Some tools use hardware counters, are architecture dependent, and are usable only on selected platforms. Since SDR base-stations can be deployed on a variety of hardware platforms, such tools are thus far from being readily usable on a consistent basis. Additionally, such tools often require a recompilation that can add unneeded and undesirable degrees of extra setup time and complexity.

BRIEF SUMMARY

In summary, one aspect of the invention provides a method comprising mapping input system parameters to work-determining parameters which act to determine computational requirements of a dynamic workload; and undertaking a synthetic experiment to measure the computational requirements determined by the work-determining parameters.

Another aspect of the invention provides an apparatus comprising at least one processor; and a computer readable storage medium having computer readable program code embodied therewith and executable by the at least one processor, the computer readable program code comprising: computer readable program code configured to map input system parameters to work-determining parameters which act to determine computational requirements of a dynamic workload; and computer readable program code configured to undertake a synthetic experiment to measure the computational requirements determined by the work-determining parameters.

An additional aspect of the invention provides a computer program product comprising a computer readable storage medium having computer readable program code embodied therewith, the computer readable program code comprising: computer readable program code configured to map input system parameters to work-determining parameters which act to determine computational requirements of a dynamic workload; and computer readable program code configured to undertake a synthetic experiment to measure the computational requirements determined by the work-determining parameters.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
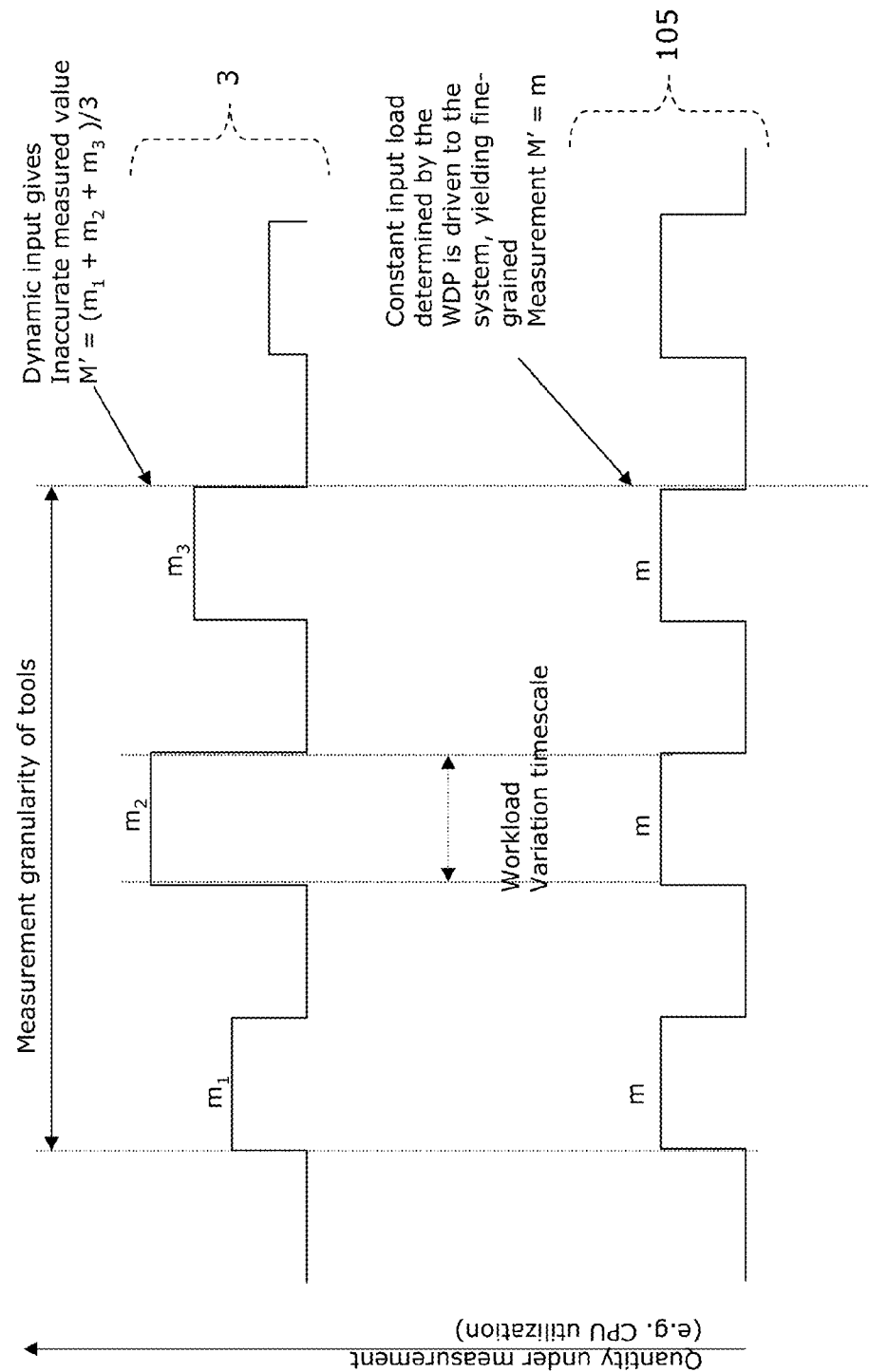
FIG. 1 schematically illustrates a comparison between a process employed conventionally and one carried out in accordance with at least one embodiment of the invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-5. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 3:
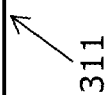
FIG. 3 depicts a table which shows some sample measurements of a WiMAX MAC stack's processing latencies for different frame-sizes.
Figure 4:
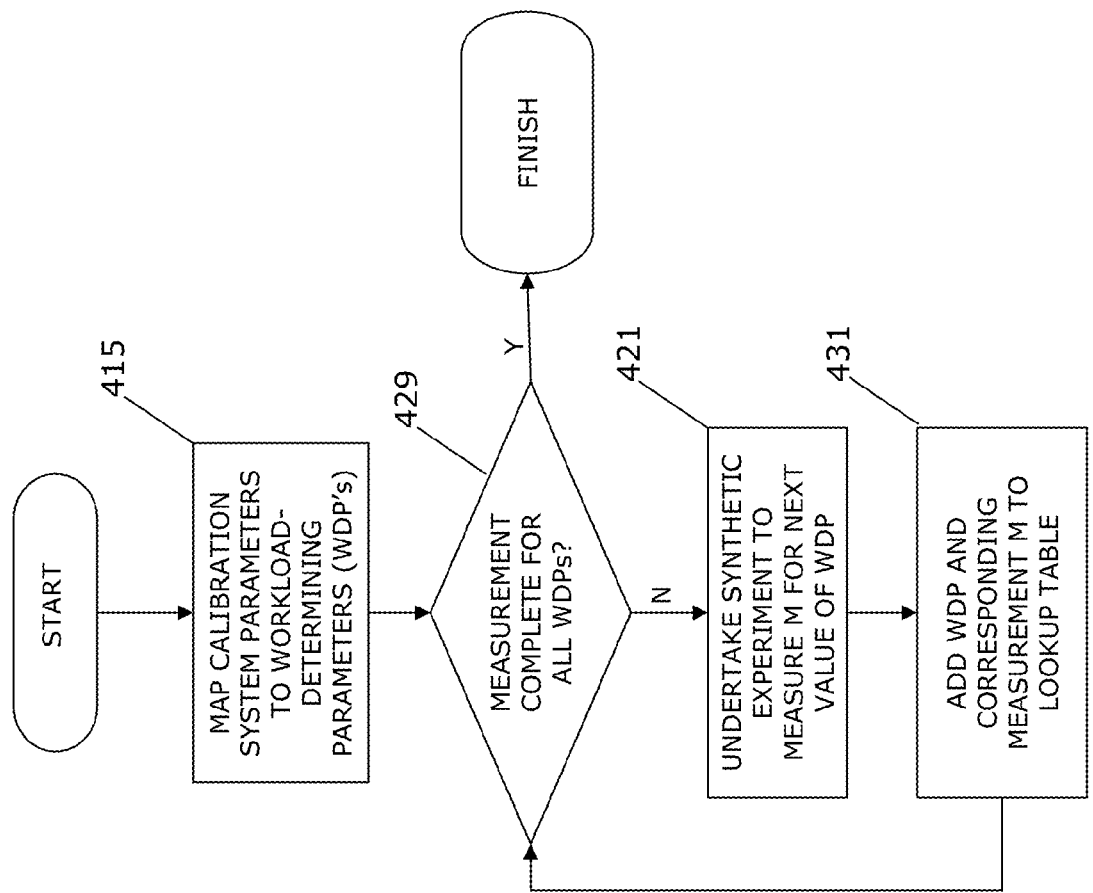
FIG. 4 broadly illustrates a mapping and experimentation process
Figure 5:
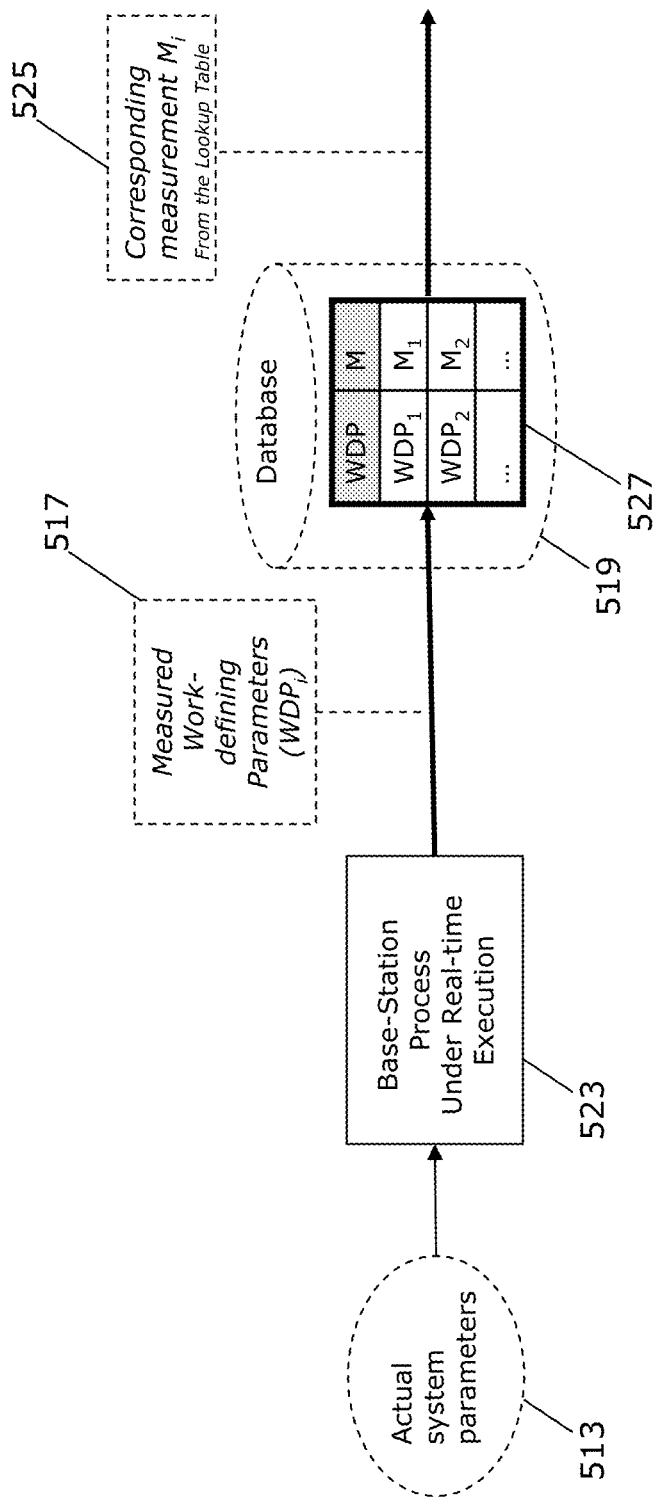
FIG. 5 schematically illustrates elements and steps for characterizing dynamic software base-station workloads during operation in real-time.

To facilitate easier reference, in advancing from FIG. 1 to and through FIG. 5, a reference numeral is advanced by a multiple of 100 in indicating a substantially similar or analogous component or element with respect to at least one component or element found in at least one earlier figure among FIGS. 1-5.

There are broadly contemplated herein, in accordance with at least one embodiment of the invention, methods and arrangements for estimating computation and memory resource utilization for real-time base-station modules at a fine-grained timescale, with low overhead and easily portable tools.

For general overview purposes, FIG. 1 schematically illustrates a comparison between a profiling process employed conventionally (3) and one carried out in accordance with at least one embodiment of the invention (105). The profiling is done with respect to a stack whose computational requirements vary very quickly, as discussed herethroughout. As shown, in accordance with the conventional process (3), where the profiling granularity is insufficient, an averaged measured value is provided as $M'=(m_1+m_2+m_3)/3$. In contrast, in accordance with a process according to at least one embodiment of the invention (105), a constant input load is driven to the system synthetically, yielding a fine-grained measurement of $M'=m$. Embodiments of the invention, as can be specifically carried out with respect to a computational stack and which elicit results such as those which can be appreciated from FIG. 1, are now to be discussed in greater detail.

Figure 2:
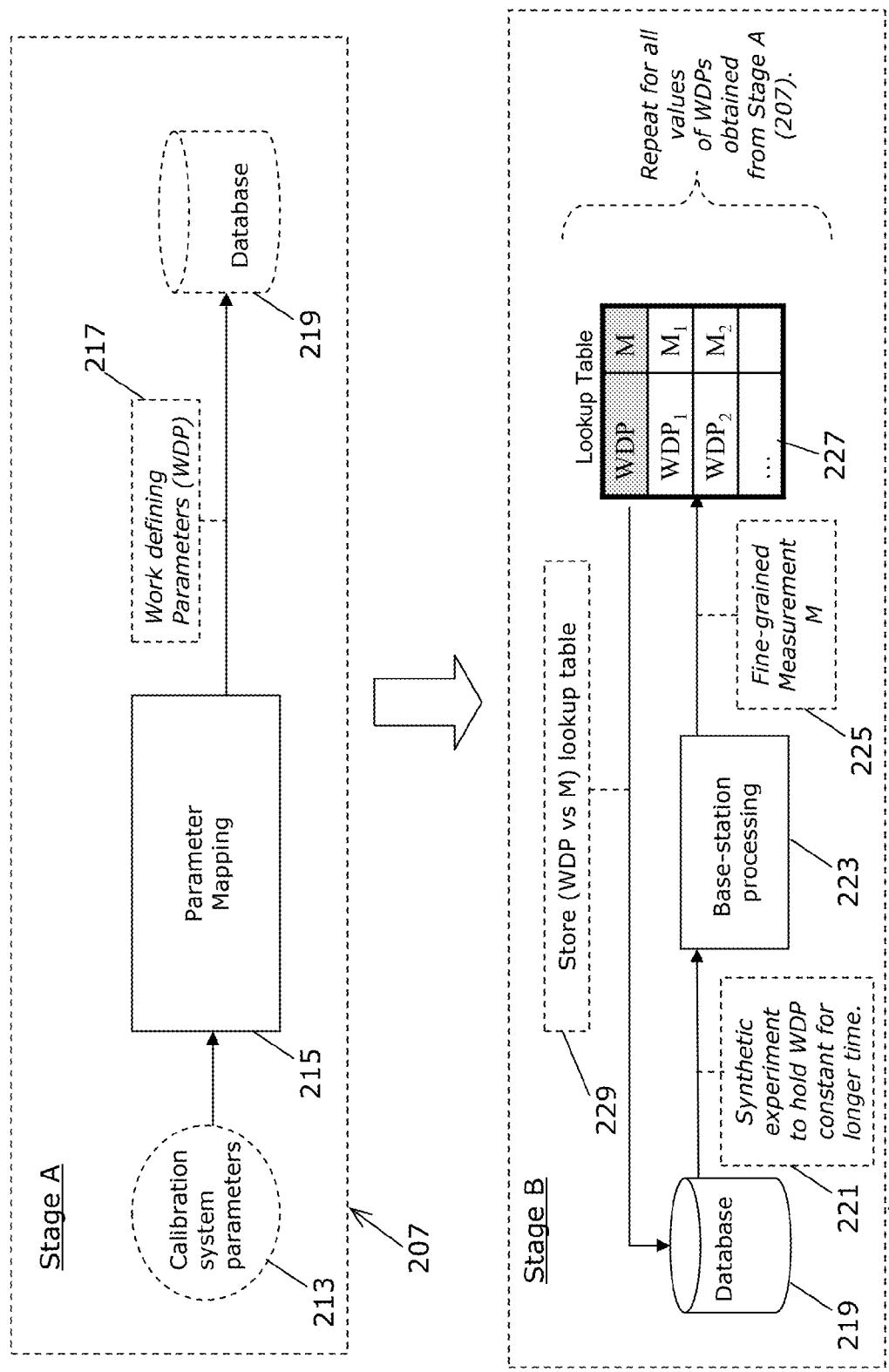
FIG. 2 schematically illustrates elements and steps for carrying out a workload characterization process.

FIG. 2 schematically illustrates elements and steps for carrying out a workload characterization process in accordance with at least one embodiment of the invention. In a first process stage, or "Stage A" 207, a calibration set of high-level base-station system parameters SP (e.g., user arrival rates, expected traffic mix) (213) is mapped (215) to intermediate parameters 217 (which can be referred to as work-determining parameters, or WDP) that uniquely determine the workload requirements at the level of a smallest unit of work (e.g., per-user throughput) and which are transmitted to a database 219 that is employed in "Stage B" 209 (itself discussed herebelow). Since the user-traffic is time-varying, the WDP values 217 extracted will also be of a time-varying function. This stage (207) can be undertaken via suitable mathematical modeling, or traffic simulation, for the given SP and BS scheduler(s). If desired, certain key values of WDP (e.g., peak and average) can be extracted here, for which measurements could be made subsequently.

In accordance with at least one embodiment of the invention, in a second process stage, or "Stage B" 209, a synthetic measurement experiment (221) is created from database 219 where the WDP is maintained at one constant value over a sufficiently large time (e.g., about 5 seconds, or about 1000 frames) and a standard coarse measurement tool can be used to measure resource consumption for this constant workload. Accordingly, for each value of WDP, e.g., a per-user frame load, a constant WDP value can be artificially simulated towards the base-station 223. For this artificially generated constant load, a coarse measurement tool can be used to measure the resource utilization of the base-station modules for this longer duration. Finally, the measurement can be scaled down to a fine-grained frame-duration scale (225) using a linear scaling. Since a constant frame load will have been simulated to the base-station 223 over a long time, this is a valid scaling and does not affect accuracy.

In accordance with at least one embodiment of the invention, Stage B (209) can be repeated for all WDP values of interest, in order to obtain a complete profiling. A lookup table T (227), containing a mapping from typical values of WDP to measurements, and can be employed such that it is leveraged in this second stage (and can be stored [229] at database 219). On the other hand, Stage A (207) can be performed offline, wherein real-time execution of the system is employed for creating the lookup table T.

Generally, in accordance with at least one embodiment of the invention, it should be appreciated that once WDP's are chosen, parameter mapping can be undertaken in any of a wide variety of manners, depending on workload. Traffic simulations using models, use of pre-recorded traffic traces, and mathematical modeling represent but a few examples.

By way of further appreciating an experimental methodology that can be employed in accordance with at least one embodiment of the invention, it can be noted that hardware provisioning normally is undertaken for a base-station such that it can meet its frame deadlines at all times, even at the heaviest frame loads that it is expected to face under a given traffic setting. Consequently, it is desirable to estimate the peak per-frame resource requirements of the stack under realistic traffic conditions and provision accordingly. To do this with reasonable accuracy, a stack can desirably be profiled at a granularity of about a millisecond or lower (though if the deadline is once every 5 ms, the actual processing on the estimation platform might finish earlier). However, conventional tools are not accurate at such low granularities. Other conventional tools require hardware support that is not available for all architectures.

As such, there are broadly contemplated herein, in accordance with at least one embodiment of the invention, methods and arrangements employing a two-stage CPU utilization estimation approach which exploits knowledge of certain characteristics of the underlying base-station process and provides accurate profiling at a frame level.

In accordance with at least one embodiment of the invention, in Stage A (207 in FIG. 2), realistic user traffic is simulated to a network of base-stations, wherein user traffic can be simulated to the base-station process by way of mapping SP's to WDP's. User traffic can be modeled using a Poisson arrival-departure model, or any other suitable model. For each frame duration, a cumulative size of the packets queued to each MAC module is measured. Assuming that the input data rate does not exceed frame capacity, this cumulative packet-size also represents the size of WiMAX frame processed by the MAC layer (ignoring frame overheads). Generally, in the context of this traffic input, the desired WDP, e.g., size of the processed base-station frame, can be extracted at the output of the base-station process. From this stage (207), a time-plot of the WDP's for the base-station process under a desired traffic setting can be obtained and stored.

In accordance with at least one embodiment of the invention, Stage B (209 in FIG. 2) can involve, now having estimated a WDP plot for the base-station, a mapping of the measured workload to a corresponding CPU utilization. For this, a profiling experiment is synthesized as follows. A constant input workload is simulated to the stack such that the WDP is held constant for a long duration. For this constant workload, and by way of an illustrative and non-restrictive example, the base-station is profiled over coarse-granularity of 5 seconds using a conventional tool (such as the Linux tool "top") in its shell-mode. The measured latency is then averaged by the number of elapsed frames in this 5 second interval, i.e., 1000 frames, to give an estimate of the per-frame CPU latency for this given workload.

In accordance with at least one embodiment of the invention, the process described immediately above is repeated for different values of WDP and a WDP-to-CPU utilization map is obtained. This mapping can then used to map the WDP to a SPU utilization value.

In accordance with at least one embodiment of the invention, FIG. 3 depicts a table 311 which shows some sample measurements of a WiMAX MAC stack's processing latencies for different input loads, obtained using the method described in accordance with Stage B (209 in FIG. 2) hereinabove. Measurements were conducted for a frame-size granularity of 200 bytes. Column II of the table shows the per-frame processing latencies (PF[S]) in microseconds, for different frame-sizes (S) measured using this method. Column III shows the equivalent number of CPU cycles consumed by the MAC stack per frame duration. This was computed as $CPF(S)=PF(S) \times F$, where F denotes the processor frequency of $3 \times 10^9$ cycles per second. Finally, Column IV shows the equivalent CPS, computed by normalizing CPF(S) by the frame duration (5 ms). As can be seen, the processing latency of the MAC layer is an increasing function of the frame-size of the WiMAX MAC. Consequently, reduction in the processed frame-size implies a reduction in the CPU speed required to support the MAC.

Drawing on examples discussed hereinabove, FIG. 4 broadly illustrates a mapping and experimentation process in accordance with at least one embodiment of the invention. As shown, system parameters are mapped to work-determining parameters which act to determine requirements of the dynamic workload (415). If measurement is not complete for all WDP's (429), a synthetic experiment is undertaken to measure the requirements M determined by the work-determining parameters (421) and the measured value of M is added to the WDP vs. M lookup table (421).

FIG. 5 schematically illustrates elements and steps for characterizing dynamic software base-station workloads during operation in real-time, in accordance with at least one embodiment of the invention. As shown, actual system parameters 513 are fed to a base-station process under real-time execution (523). WDP's as measured (517) are then sent to lookup table 527 in database 519, and a corresponding measurement M (525) is obtained from the lookup table.

Figure 6:
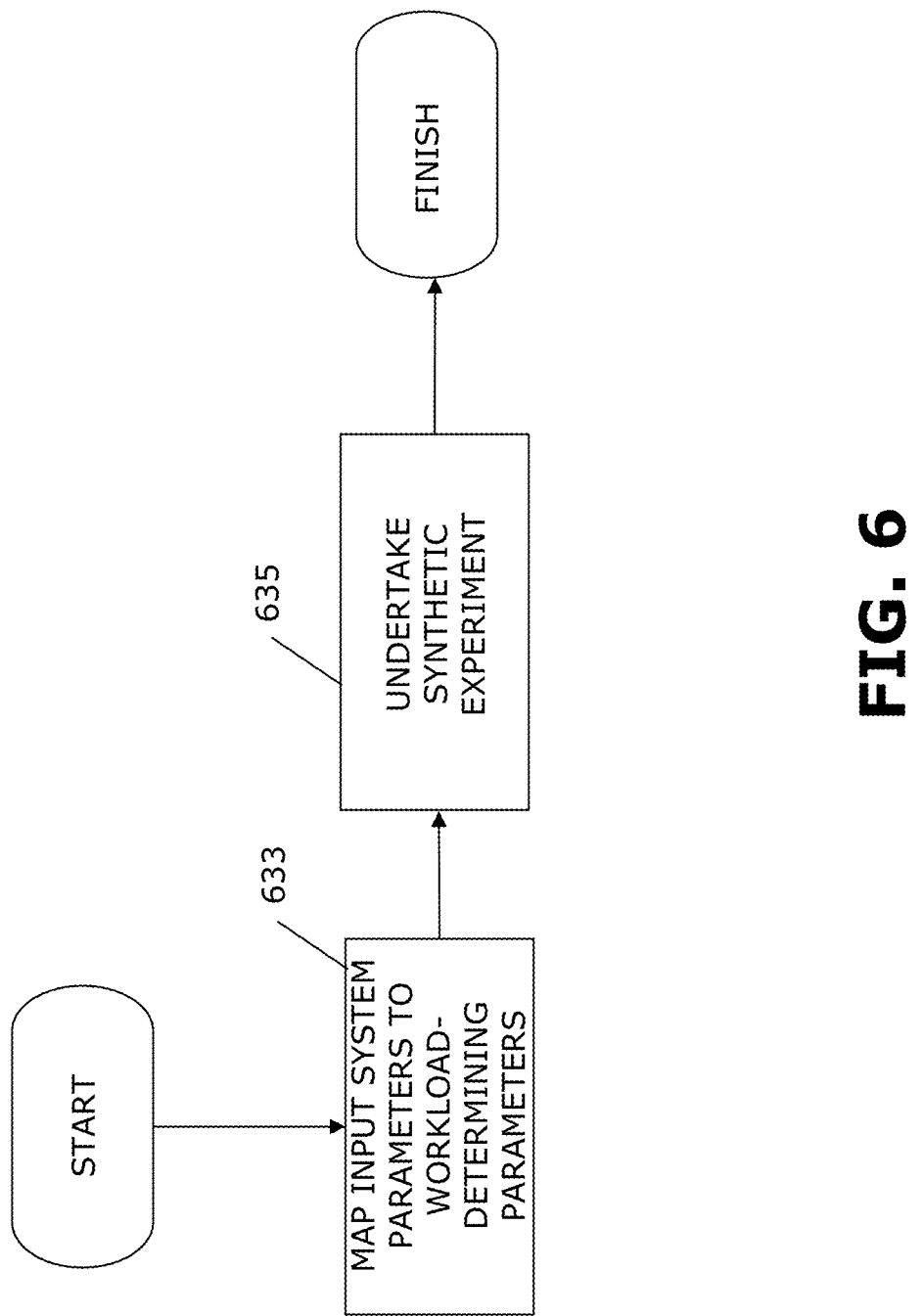
FIG. 6 sets forth a process more generally for characterizing software base-station workloads.

FIG. 6 sets forth a process more generally for characterizing software base-station workloads, in accordance with at least one embodiment of the invention. It should be appreciated that a process such as that broadly illustrated in FIG. 6 can be carried out on essentially any suitable computer system or set of computer systems, which may, by way of an illustrative and on-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, input system parameters are mapped to work-determining parameters which act to determine computational requirements of the dynamic workload (633), and a synthetic experiment is undertaken to measure the computational requirements determined by the work-determining parameters (635).

Figure 7:
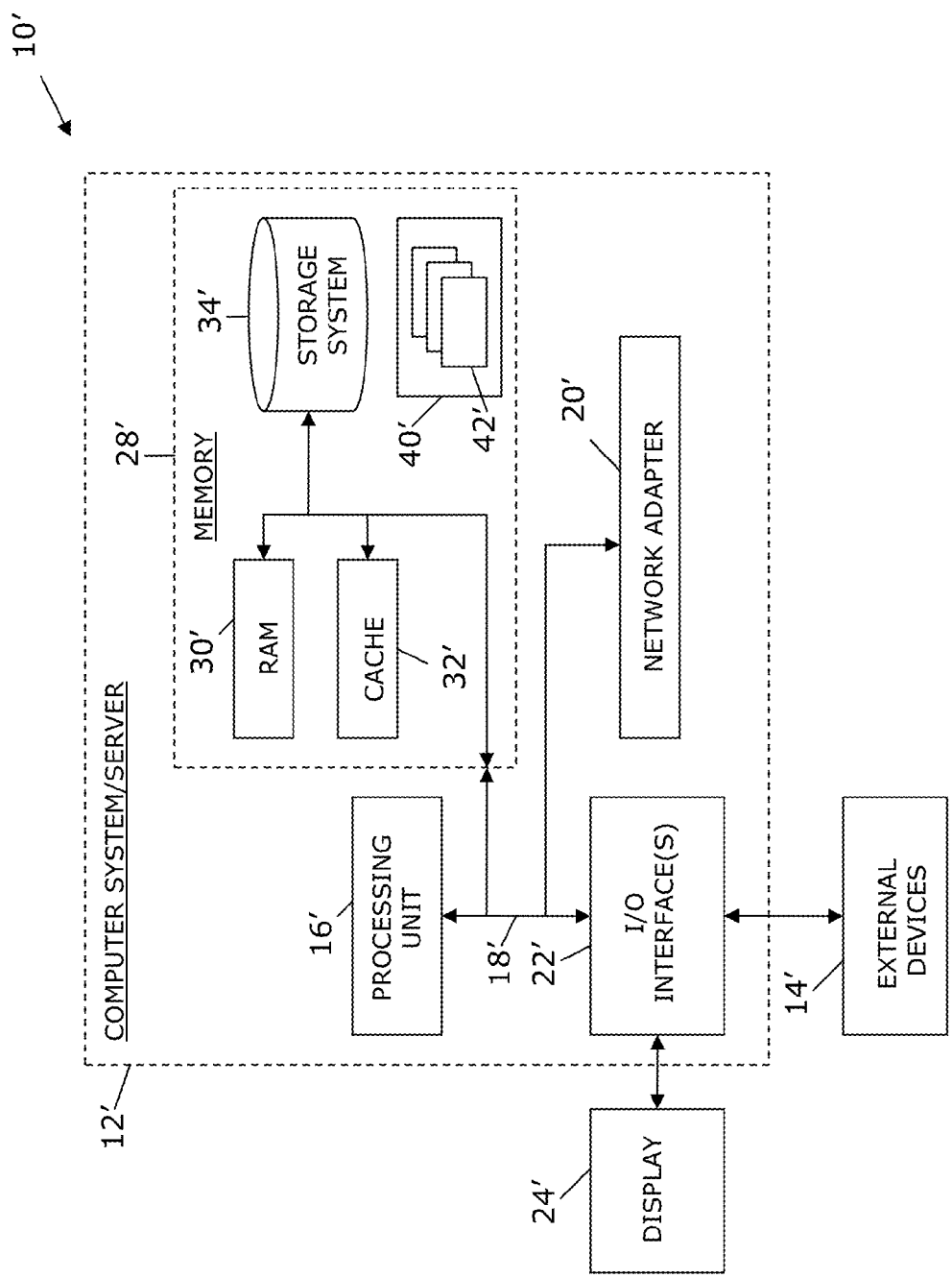
FIG. 7 illustrates a computer system.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   mapping input system parameters to work-determining parameters which act to determine computational requirements of a dynamic workload of a base station, wherein the dynamic workload varies at time frames comprising small units of time; and
   undertaking a synthetic experiment to measure the computational requirements determined by the work-determining parameters, wherein the undertaking a synthetic experiment comprises:
   maintaining a value of the work-determining parameters at a constant value over a predetermined interval of time, wherein the predetermined interval of time comprises a plurality of time frames;
   measuring a resource consumption of the value of the work-determining parameters over the predetermined interval of time; and
   scaling the measured resource consumption down to a fine-grained frame-duration scale.

2. The method according to claim 1, wherein the dynamic workload varies at time frames comprising 5 milliseconds or less.

3. The method according to claim 1, wherein said mapping comprises forming a lookup table which maps each instance of work-determining parameters to a measured requirement of interest.

4. The method according to claim 3, wherein said undertaking of a synthetic experiment comprises predicting the requirements via simulating one or more values of one or more of the work-determining parameters.

5. The method according to claim 4, wherein said predicting comprises employing the lookup table to obtain the measured requirement of interest.

6. The method according to claim 1, wherein said mapping comprises employing at least one taken from the group consisting of a traffic model, a real traffic trace.

7. The method according to claim 1, wherein the input system parameters include at least one taken from the group consisting of: number of users, number of traffic flows, rate of traffic flows.

8. The method according to claim 1, wherein the work defining parameters include at least one taken from the group consisting of: number of active connections, number of scheduled users, frame load.

9. The method according to claim 8, wherein the frame load is expressed as a number of bytes.

10. The method according to claim 1, wherein said maintaining a value is performed during real-time execution.

11. An apparatus comprising:
    at least one processor; and
    a non-transitory computer readable storage medium having computer readable program code embodied therewith and executable by the at least one processor, the computer readable program code comprising:
    computer readable program code configured to map input system parameters to work-determining parameters which act to determine computational requirements of a dynamic workload of a base station, wherein the dynamic workload varies at time frames comprising small units of time; and
    computer readable program code configured to undertake a synthetic experiment to measure the computational requirements determined by the work-determining parameters, wherein the undertaking a synthetic experiment comprises:
    maintaining a value of the work-determining parameters at a constant value over a predetermined interval of time, wherein the predetermined interval of time comprises a plurality of time frames;
    measuring a resource consumption of the value of the work-determining parameters over the predetermined interval of time; and
    scaling the measured resource consumption down to a fine-grained frame-duration scale.

12. A computer program product comprising:
    a non-transitory computer readable storage medium having computer readable program code embodied therewith, the computer readable program code comprising:
    computer readable program code configured to map input system parameters to work-determining parameters which act to determine computational requirements of a dynamic workload of a base station, wherein the dynamic workload varies at time frames comprising small units of time; and
    computer readable program code configured to undertake a synthetic experiment to measure the computational requirements determined by the work-determining parameters, wherein the undertaking a synthetic experiment comprises:
    maintaining a value of the work-determining parameters at a constant value over a predetermined interval of time, wherein the predetermined interval of time comprises a plurality of time frames;
    measuring a resource consumption of the value of the work-determining parameters over the predetermined interval of time; and
    scaling the measured resource consumption down to a fine-grained frame-duration scale.

13. The computer program product according to claim 12, wherein the dynamic workload varies at a time scale of about 5 milliseconds or less.

14. The computer program product according to claim 12, wherein said computer readable program code is configured to form a lookup table which maps each instance of work-determining parameters to a measured requirement of interest.

15. The computer program product according to claim 14, wherein the undertaking of a synthetic experiment comprises predicting the requirements via simulating one or more values of one or more of the work-determining parameters.

16. The computer program product according to claim 15, wherein said computer readable program code is configured to employ the lookup table to obtain the measured requirement of interest.

17. The computer program product according to claim 12, wherein said computer readable program code is configured to map via employing at least one taken from the group consisting of: a traffic model, a real traffic trace.

18. The computer program product according to claim 12, wherein the input system parameters include at least one taken from the group consisting of: number of users, number of traffic flows, rate of traffic flows.

19. The computer program product according to claim 12, wherein the work defining parameters include at least one taken from the group consisting of: number of active connections, number of scheduled users, frame load.

20. The computer program product according to claim 19, wherein the frame load is expressed as a number of bytes.

21. The computer program product according to claim 12, wherein said computer readable program code is configured to perform the maintaining a value during real-time execution.

\* \* \* \* \*